United States Patent
Zhang et al.

(10) Patent No.: US 11,082,082 B2
(45) Date of Patent: Aug. 3, 2021

(54) SIGNAL CALIBRATION METHOD, AND DEVICE GENERATED BASED ON IMBALANCE OF I PATH AND Q PATH, AND STORAGE MEDIUM

(71) Applicant: Radiawave Technologies Co., Ltd., Guangdong (CN)

(72) Inventors: Liuan Zhang, Guangdong (CN); Ning Zhang, Guangdong (CN); Haigang Feng, Guangdong (CN); Jon Sweat Duster, Beaverton, OR (US); Yulin Tan, Guangdong (CN)

(73) Assignee: Radiawave Technologies Co., Ltd., Guangdong (CN)

(*) Notice: Subject to any disclaimer, the term of this patent is extended or adjusted under 35 U.S.C. 154(b) by 0 days.

(21) Appl. No.: 16/959,437

(22) PCT Filed: Dec. 29, 2018

(86) PCT No.: PCT/CN2018/125259
§ 371 (c)(1),
(2) Date: Jul. 1, 2020

(87) PCT Pub. No.: WO2019/137254
PCT Pub. Date: Jul. 18, 2019

(65) Prior Publication Data
US 2020/0373964 A1    Nov. 26, 2020

(30) Foreign Application Priority Data
Jan. 12, 2018 (CN) .......................... 201810033342.1

(51) Int. Cl.
*H04L 5/12* (2006.01)
*H04B 1/7107* (2011.01)
(Continued)

(52) U.S. Cl.
CPC ......... *H04B 1/7107* (2013.01); *H04B 1/0042* (2013.01); *H04B 1/0475* (2013.01)

(58) Field of Classification Search
CPC ... H04L 1/0054; H04L 1/005; H04L 27/2863; H04L 27/2278; H03F 1/3288;
(Continued)

(56) References Cited

U.S. PATENT DOCUMENTS

| | | | |
|---|---|---|---|
| 6,340,883 B1* | 1/2002 | Nara | G01R 23/16 324/76.19 |
| 8,374,300 B2* | 2/2013 | Komalil | H04L 27/3863 375/346 |

(Continued)

FOREIGN PATENT DOCUMENTS

| | | |
|---|---|---|
| CN | 1984101 A | 6/2007 |
| CN | 101540618 A | 9/2009 |

(Continued)

*Primary Examiner* — Khai Tran

(57) ABSTRACT

The present disclosure provides a signal calibration method, apparatus and device generated based on an imbalance of I path and Q path. The method includes sending a cosine signal and a sine signal through a signal generator, transmitting the cosine signal and the sine signal in the I path and the Q path respectively, the cosine signal and the sine signal being configured to loop back to a signal receiving direction after passing through a transmitting amplifier; processing a signal obtained by a down converter in the signal receiving direction; performing a phase adjustment and an amplitude adjustment by adjusting the signal generator, gain amplifiers of I path and Q path analog domains, and a corresponding digital domain, so as to determine an appropriate phase cancellation value and an appropriate amplitude cancellation value for an image signal; and calibrating the image signal corresponding to the signal to be calibrated.

19 Claims, 3 Drawing Sheets

(51) Int. Cl.
*H04B 1/00* (2006.01)
*H04B 1/04* (2006.01)
(58) Field of Classification Search
CPC ....... H03F 2200/336; H03F 2200/0336; H04B
17/21; H04B 1/0475; H04F 2200/294;
H03D 3/009
USPC ........................................................ 375/262
See application file for complete search history.

(56) References Cited

U.S. PATENT DOCUMENTS

| 2004/0165678 | A1* | 8/2004 | Nadiri | ...................... | H04L 1/244 |
| | | | | | 375/296 |
| 2009/0325516 | A1 | 12/2009 | Safavi | | |
| 2015/0200628 | A1* | 7/2015 | Rutten | ................ | H04L 27/3863 |
| | | | | | 455/326 |

FOREIGN PATENT DOCUMENTS

| CN | 102025666 | A | 4/2011 |
| CN | 105490759 | A | 4/2016 |
| CN | 105490973 | A | 4/2016 |
| CN | 108259404 | A | 7/2018 |
| EP | 2693633 | A1 | 2/2014 |

\* cited by examiner

SIGNAL CALIBRATION METHOD, AND DEVICE GENERATED BASED ON IMBALANCE OF I PATH AND Q PATH, AND STORAGE MEDIUM

FIELD

The present application relates to the field of communications technologies, and in particular, to a signal calibration method, apparatus and device generated based on an imbalance of I path and Q path.

BACKGROUND

With the rapid development of wireless technology, products using wireless communication system are becoming more and more popular. The structure and performance of the radio frequency (RF) transmitter directly affect the entire communication system. Usually, the IQ signals, namely in-phase component I signal and quadrature component Q signal, sent by the transmitter can be processed and transmitted by an I and Q analog filter, a mixer, and the like.

In digital communication, when the IQ signal transmitted by the RF transmitter passes through the I and Q analog filter, there may even be a large or considerable deviation due to the inconsistency between the pole and the zero of the impulse response of the I and Q analog filter, which may cause a problem of frequency domain selective IQ imbalance when the I path and Q path generate signals.

The image signal is usually generated after mixing a RF part. However, for the image signal calibration problem caused by the imbalance of I path and Q path, there is no suitable solution in the existing art, which leads to the calibration of the existing image signal. So that the accuracy of the existing image signal calibration is generally too low.

SUMMARY

The main objective of the present disclosure is to provide a signal calibration method, apparatus and device generated based on an imbalance of I path and Q path, aiming at solving the image signal calibration problem caused by the imbalance of I path and Q path, and the low accuracy of the existing image signal calibration due to the absence of suitable solution in the existing art.

One aspect of the present disclosure provides a signal calibration method generated based on an imbalance of an I path and a Q path, including:

sending a cosine signal and a sine signal through a signal generator with configurable signal amplitude and phase when receiving a signal to be calibrated, transmitting the cosine signal and the sine signal in the I path and the Q path respectively, each path corresponding to a signal, the cosine signal and the sine signal being configured to loop back to a signal receiving direction after passing through a transmitting amplifier;

processing a signal obtained by a down converter in the signal receiving direction according to a preset Fourier transformation rule;

performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal; and calibrating the image signal corresponding to the signal to be calibrated according to the phase cancellation value and the amplitude cancellation value.

Another aspect of the present disclosure provides a signal calibration apparatus generated based on an imbalance of an I path and a Q path, including:

a configuring unit, configured for sending a cosine signal and a sine signal through a signal generator with configurable signal amplitude and phase when receiving a signal to be calibrated, and transmitting the cosine signal and the sine signal in the I path and the Q path respectively, wherein each path is configured to correspond to a signal, the cosine signal and the sine signal are configured to loop back to a signal receiving direction after passing through a transmitting amplifier;

a processing unit, configured for processing a signal obtained by a down converter in the signal receiving direction according to a preset Fourier transformation rule;

an adjusting unit, configured for performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal; and a calibrating unit, configured for calibrating the image signal corresponding to the signal to be calibrated according to the phase cancellation value and the amplitude cancellation value.

Another aspect of the present disclosure provides a storage medium, on which a computer program is stored, the program when executed by a processor performs a signal calibration method generated based on an imbalance of an I path and a Q path.

A further aspect of the present disclosure provides a signal calibration device generated based on an imbalance of an I path and a Q path, including a storage medium, a processor, and a computer program stored on the storage medium and executable on the processor, the processor when executing the program performs a signal calibration method generated based on the imbalance of the I path and the Q path.

With the above technical solution, the present disclosure provides a signal calibration method, apparatus and device generated based on an imbalance of I path and Q path. Compared with the existing art, the present disclosure conducts a special theoretical analysis of the image signal generated after the RF part is mixed, sends out a cosine signal and a sine signal through the signal generator with configurable signal amplitude and phase when receiving a signal to be calibrated, and transmits the cosine signal and the sine signal on the I path and the Q path, for realizing accurately controlling amplitude and phase of the calibration signal. The signal obtained by the down converter in the signal receiving direction is processed according to a preset Fourier transformation rule. A phase adjustment and an amplitude adjustment are performed by adjusting the signal generator, gain amplifiers of I path and Q path analog domains, and a corresponding digital domain according to the processing result, respectively, so as to accurately determine an appropriate phase cancellation value and an appropriate amplitude cancellation value for an image signal and to calibrate the image signal. As such, in the case of imbalance of I path and Q path, high-precision image signal correction and cancellation can be achieved.

The above description is only an overview of the technical solutions of the present disclosure. In order to be able to understand the technical means of the present disclosure more clearly, it can be implemented in accordance with the content of the specification, and in order to make the above and other purposes, features and advantages of the present disclosure obvious, the specific implementation of the present disclosure is listed below.

BRIEF DESCRIPTION OF THE DRAWINGS

The drawings described herein are used to provide a further understanding of the present disclosure and form part of the present disclosure. The exemplary embodiments and descriptions of the present disclosure are used to explain the present disclosure and do not constitute an undue limitation on the present disclosure. In the drawings.

DETAILED DESCRIPTION OF THE EMBODIMENTS

Hereinafter, the present application will be described in detail with reference to the accompanying drawings and in conjunction with the embodiments. It should be noted that the embodiments in the present application and the features in the embodiments can be combined with each other if there is no conflict.

Figure 1:
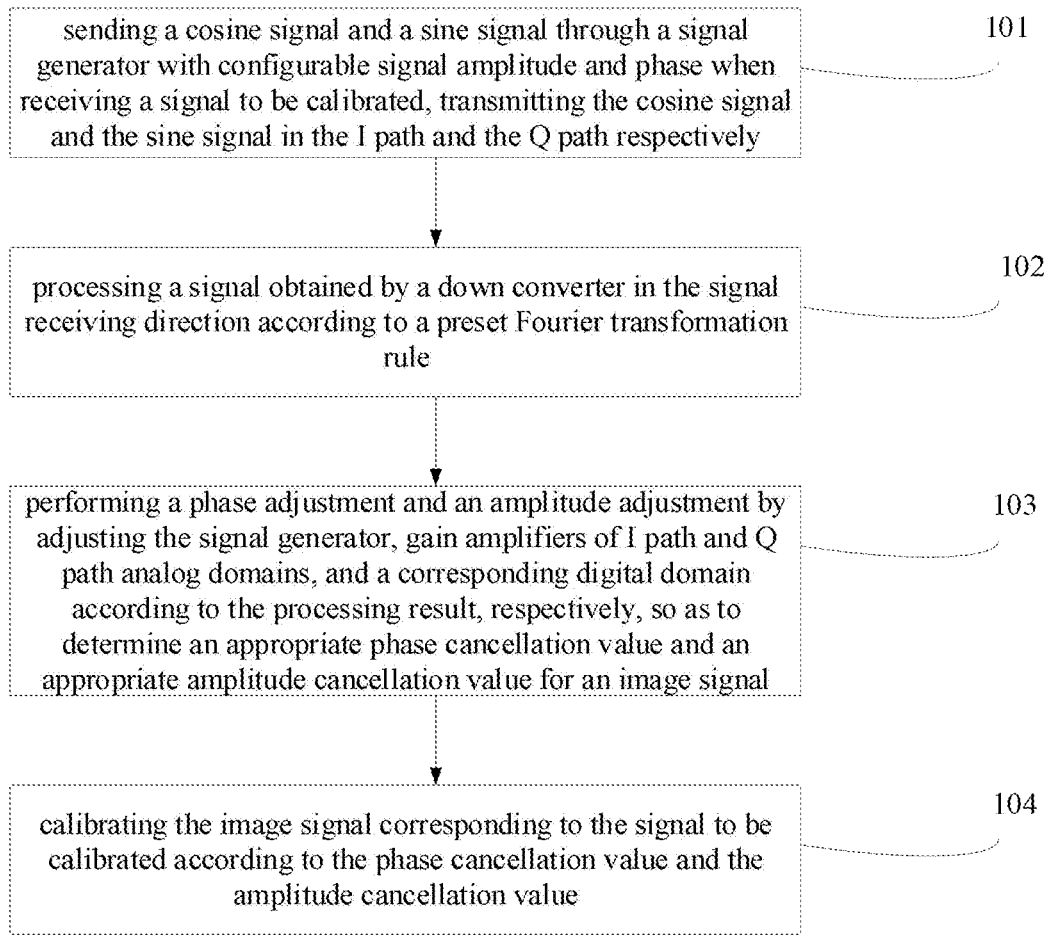
FIG. 1 shows a schematic flowchart of a signal calibration method generated based on an imbalance of an I path and a Q path provided by an embodiment of the present disclosure.

In the embodiment, the present disclosure provides a signal calibration method generated based on an imbalance of an I path and a Q path, which can achieve high-precision image signal correction and cancellation in the case of the imbalance of I path and Q path. As shown in FIG. 1, the method includes:

101, sending a cosine signal and a sine signal through a signal generator with configurable signal amplitude and phase when receiving a signal to be calibrated, transmitting the cosine signal and the sine signal in the I path and the Q path respectively.

Each path corresponds to a signal, and the cosine signal and the sine signal are configured to loop back to a signal receiving direction after passing through a transmitting amplifier. In the embodiment, which path to transmit the cosine signal and which path to transmit the sine signal can be selected and set according to actual needs.

In order to adapt to different application scenarios, there are multiple options for looping back to the signal receiving direction. As an optional method, for this embodiment, it may also loop back to the signal receiving direction after passing other components behind the transmitting amplifier.

The executive body of this embodiment may be a device that automatically calibrates and adjusts the image signal under the imbalance condition of I path and Q path. In the signal transmission (TX) direction, the device uses signal generator with configurable signal amplitude and phase to send out the cosine signal and the sine signal, and arranges the cosine signal and the sine signal to transmit on the I path and Q path respectively, and to loop back to the receiving amplifier in the signal receiving (RX) direction after passing through the transmitting mixer and transmitting amplifier, then transmits to the analog-to-digital converter after passing through the receiving mixer and the analog baseband circuit.

In order to realize the generating of the cosine signal and the sine signal by the signal generator, one alternative way is to generate sine and cosine waves based on a cordic principle; another alternative way is to store data points of the sine and cosine wave to a Random Access Memory (RAM), in order to send out waveforms of the sine and cosine waves from the RAM using the waveform generator, and then send out the cosine signal and the sine signal. At the same time, in this embodiment, the amplitude and phase can be configured, for example, the sine signal is configurable on the I path or the Q path, and the cosine signal is configurable on the I path or the Q path.

Further, in order to improve the phase accuracy of the cosine signal and the sine signal, at least 16 bits are required to represent 360 degrees to achieve higher calibration accuracy when processing a fix-point, nor does it exclude that in some cases a bit width is reduced to ignore the accuracy case. Digital-to-analog converter (DAC) and analog-to-digital converter (ADC) can also be arranged to higher clock rates (such as 160M, etc.) to further improve the accuracy of calibration.

102, processing a signal obtained by a down converter in the signal receiving direction according to a preset Fourier transformation rule.

The preset Fourier transformation rule can be configured according to actual needs by selecting an appropriate algorithm, as an optional way, the preset Fourier transformation rule can be a variable length sparse Fourier transformation (SFT) rule which can be regarded as a simple discrete Fourier transformation (DFT), DFT is configured to calculate for a single frequency point or a few frequency points, the frequency point is configurable. Of course, the preset Fourier transformation rule can also use a fast Fourier transformation (FFT). In this calibration, SFT may save more resources. For this embodiment, in the image signal estimation, the variable length SFT rule is adopted, which can improve the accuracy of the image signal estimation under different signal-to-noise ratios, and can be used to more accurately estimate the received frequency components in smaller scales.

103, performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal.

In this embodiment, the image signal calibration can be divided into a phase calibration and an amplitude calibration. In order to perform amplitude calibration more accurately, as an optional method, the amplitude calibration is divided into an analog domain calibration and a digital domain calibration. Correspondingly, the above amplitude cancellation value includes the gain value of the gain amplifier of the analog domain and the corresponding gain value of the digital domain.

For a signal s, $s = a1*\cos(2*pi*\omega*t+\varphi_1) - a2*\cos(2*pi*\omega*t+\varphi_2)$, a1, a2, $\omega$, and t are parameters in a cosine or sine function. When $\varphi_1 = \varphi_2$, s reaches the minimum on the basis of phase adjustment, when a1=a2, s further reaches the global minimum on the basis of equal phase and amplitude.

Therefore, in the first step, the phase can be adjusted first, and the minimum value of the image can be found on the basis of phase traversal or phase local traversal. Then in the second step, the amplitude can be adjusted to perform the amplitude traversal or local amplitude traversal to find the global minimum value of image. In this way, the global phase and amplitude cancellation values can be obtained. Of course, it is also possible to find the sig local maximum value on the basis of phase traversal or phase local traversal, and to find the sig global maximum value on the basis of amplitude traversal or local amplitude traversal.

The above may be based on the mixer value at the image frequency being sufficiently small relative to the local oscillator (LO) mixer value, for example, when the difference between the two is more than 30 db.

Based on the above solution, in order to illustrate the specific implementation process of step 103, in an optional manner, step 103 may specifically include: adjusting the phase by adjusting the signal generator according to the processing result in step 102, and monitoring the minimum value corresponding to the image signal or the maximum value corresponding to the sig signal by performing the phase local traversal or the phase global traversal, so as to record the best phase value that the corresponding image signal needs to compensate at this time, as the phase cancellation value of the image signal; performing the amplitude adjustment by adjusting the gain amplifier of the I path or Q path analog domain according to the processing result in step 102, and monitoring the minimum value corresponding to the image signal or the maximum value corresponding to the sig signal based on the adjustment of the gain amplifier, so as to record the gain value of the gain amplifier of the corresponding analog domain at this time; in the digital domain, by performing an amplitude local traversal or an amplitude global traversal, monitoring a global minimum value corresponding to the image signal or a global maximum value corresponding to the sig signal to record the corresponding gain value of the digital domain at this time Regarding the calibration of the phase, after the signal of the down converter is subjected to SFT processing, the representation quantity of the corresponding amplitude of the image signal in the frequency domain is obtained. Then the signal generator is adjusted based on the cordic principle according to this representation quantity, all or part of the phases are searched or traversed to get the smallest representation quantity which is the best value that needs to be compensated. The phase search includes a negative phase and a positive phase.

For example, the signal generator sends the cosine signal to the I path, and sends the sine signal to the Q path based on the cordic principle. The cosine signal and the sine signal loops back to the receiving amplifier after passing through the transmitting mixer and the amplifier, then transmits to the analog-to-digital converter after passing through the receiving mixer and the analog baseband circuit. A phase local traversal or a phase global traversal is performed on I path cosine signal phase of the signal generator. After ADC, the size of the image signal or the size of the sig signal can be monitored through SFT processing. When the minimum value of the image signal or the maximum value of the sig signal is monitored, the corresponding phase is the best phase to be compensated at this time.

With regard to the calibration of the amplitude, the minimum value of the image signal or the maximum value of the sig signal on the basis of this adjustment can be obtained through the gain amplifier of the I path or Q path analog domain. However, the gain amplifier has accuracy problems. For example, the gain amplifier may be only 0.25 db. Further calibration needs to be performed in the digital domain. A further accurate traversal or local traversal is performed on the digital domain to obtain the final minimum value of the image signal or the final maximum value of the sig signal.

For example, the gain amplifier of the I path or Q path analog domain are adjusted, the signal generator based on the cordic principle is started to send the cosine signal to the I path, and send the sine signal to the Q path, which loop back to the receiving amplifier after passing through the transmitting mixer and the amplifier, then transmit to the analog-to-digital converter after passing through the receiving mixer and the analog baseband circuit. After ADC, the minimum value of the image signal or the maximum value of the sig signal based on this adjustment are monitored through SFT processing, and the corresponding amplifier gain at this time is recorded as the gain value of the analog domain gain amplifier. But the gain amplifier has accuracy problems. For example, the gain amplifier may be only 0.25 db. Further gain or amplitude calibrations need to be performed in the digital domain. More accurate traversal or local traversal is performed on the digital domain, to obtain the final image signal minimum value or the final sig signal maximum value, the digital domain gain at this time is recorded.

In each of the above monitoring processes, the minimum value of the image signal or the maximum value of the sig signal needs to be monitored. In order to monitor it more accurately, as an alternative way of representation quantity, the minimum value corresponding to the image signal include:

calculating the minimum value by $I_{sft\_image}^2+Q_{sft\_image}^2$, or $\sqrt{I_{sft\_image}^2+Q_{sft\_image}^2}$, or $|I_{sft\_image}|$, or $|Q_{sft\_image}|$, and taking the minimum value as an evaluation criteria of the minimum value corresponding to the image signal, wherein, $I_{sft\_image}$ is a result obtained by processing the image signal in the I path through the SFT rule, $Q_{sft\_image}$ is a result obtained by processing the image signal in the Q path through the SFT rule; and the maximum value corresponding to the sig signal comprises:

calculating the maximum value by $I_{sft\_sig}^2+Q_{sft\_sig}^2$, or $\sqrt{I_{sig}^2+Q_{sft\_sig}^2}$, or $|I_{sft\_sig}|$, or $|Q_{sft\_sig}|$, taking the maximum value as an evaluation criteria of the maximum value corresponding to the sig signal, wherein, $I_{sft\_sig}$ is a result obtained by processing the sig signal in the I path through the SFT rule, $Q_{sft\_sig}$ is a result obtained by processing the sig signal in the Q path through the SFT rule.

It should be noted that the above-mentioned representation forms are not unique, but listed as a few optional ways, and can also have other different deformations, which can be set according to actual needs, for example, adding parameters or times values, etc.

104, calibrating the image signal corresponding to the signal to be calibrated according to the phase cancellation value and the amplitude cancellation value.

For example, according to the phase cancellation value and the amplitude cancellation value determined above, the amplitude and phase of the image signal corresponding to the signal to be compensated are compensated and adjusted, to offset the influence of the imbalance of the I path and Q path.

In order to illustrate the specific implementation process of step 104, as an optional method, step 104 may specifically include: calibrating the phase of the image signal corresponding to the signal to be calibrated with reference to the best phase value obtained in step 103; and calibrating the amplitude of the image signal corresponding to the signal to be calibrated with reference to the gain value of the gain amplifier of the analog domain and the gain value of the digital domain obtained in step 103.

The gain value of the analog domain gain amplifier includes the gain value of the analog domain gain amplifier corresponding to the I path and the gain value of the analog domain gain amplifier corresponding to the Q path respectively. Correspondingly, referring to the gain value of the analog domain gain amplifier and the digital domain gain value, the step of calibrating the amplitude of the image signal corresponding to the signal to be calibrated specifically includes: configuring the gain value of the gain amplifier of the analog domain corresponding to the I path to the gain amplifier of the I path analog domain; configuring the gain value of the gain amplifier of the analog domain corresponding to the Q path to the gain amplifier of the Q path analog domain; taking the gain value of the digital domain as a parameter, and using a preset formula, performing an amplitude compensation of the digital domain on the image signal corresponding to the signal to be calibrated. For this embodiment, by using the analog domain gain amplifier and the digital domain to perform amplitude compensation separately, the factors considered are more comprehensive, and high-precision image signal correction and cancellation can be achieved.

The preset formula can be set according to actual needs. For example, the cosine signal on the I channel and the sine signal on the Q channel sent by the signal generator are taken as an example, the best phase to be compensated is determined according to the above steps, the best phase is marked as phase$_{offset}$, the gain values of the analog domain gain amplifiers corresponding to the I path and Q path are gain$_{I-ana-offset}$ and gain$_{Q-ana-offset}$, and gain$_{I-ana-offset}$ and gain$_{Q-ana-offset}$, the gain values of the two IQ digital domains are gain$_{I-digital-offset}$, gain$_{Q-digital-offset}$ and gain$_{I-digital-offset}$, gain$_{Q-digital-offset}$, it is assumed that the I path data to be sent is $I_{tx}$, the Q path data to be sent is $Q_{tx}$.

(1) Analog Domain Compensation:

configuring gain$_{I-ana-offset}$ on the analog domain gain amplifier corresponding to the I path;

configuring gain$_{Q-ana-offset}$ on the analog domain gain amplifier corresponding to the Q path.

(2) Digital Field Compensation

The following formula is adopted:

$I_{calibrated}$=gain$_{I-digital-offset}$*$I_{tx}$*cos(phase$_{offset}$)+gain$_{I-digital-offset}$*$Q_{tx}$*sin(phase$_{offset}$), to compensate the gain value of the I path digital domain. And the formula is adopted: $Q_{calibrated}$=gain$_{Q-digital-offset}$*$Q_{tx}$ to compensate the gain value of the Q path digital domain. These two formulas can be adopted to accurately compensate the I path digital gain and the Q path digital gain.

Therefore, after the data from the digital baseband is subjected to such digital domain phase and amplitude calibration, and the gain calibration of the analog domain gain amplifier, the smallest image signal can be obtained.

It should be noted that each formula as described above is not the only formula for implementing the present application, but is only used as an implementation manner of the embodiments. Technicians can make appropriate modifications to the formula according to business needs, and still fall within the scope of this application, such as adding parameters or multiple values, etc.

The embodiments of the present application comprehensively consider the defects of the current art theory and implementation, and conduct a special theoretical analysis on the image signal generated after the RF parts are mixed, and combine the signal generator based on the cordic principle to precisely control the amplitude and phase of the signal to be calibrated, and raise the ADC and DAC to higher clock rates (such as 160M, etc.) to further improve the accuracy of the calibration. At the same time, the image signal calibration is divided into phase calibration and amplitude calibration. The amplitude calibration is divided into analog calibration and digital calibration. The minimum value of the image signal is obtained by continuously adjusting the amplitude and phase. In image signal estimation, variable-length DFT (referred to as SFT in this article) is used to improve the accuracy of image signal estimation under different signal-to-noise ratios, and can be used to estimate the received frequency component in a more accurate and smaller scale. The embodiments of the present application can realize accurate estimation of the image signal, can obtain an accurate minimum value of the image signal and an accurate phase of the image signal, the analog gain compensation value and the digital gain compensation value, thereby achieving high-precision image signal correction and cancellation.

Further, as a refinement and expansion of the specific implementation manners of the foregoing embodiments, in order to illustrate the feasibility of the foregoing implementation manners, a reasonable formula derivation is specifically performed as follows:

First, the mixing formula is derived:

Sending direction:

assuming that the amplitude of the baseband digital I path is $a_{i\_tx\_bb}$, the amplitude of the baseband analog part (before the mixer) is $a_{i\_tx\_abb}$, the amplitude of sending the mixer is $a_{i\_tx\_mixer}$; the phase of the baseband is $\theta_{itx}$, the phase of the mixer is $\beta_{itx}$;

assuming that the amplitude of the baseband digital Q path is $a_{i\_tx\_bb}$, the amplitude of the baseband analog part (before the mixer) is $a_{i\_tx\_abb}$, the amplitude of sending the mixer is $a_{i\_tx\_mixer}$; the phase of the baseband is $\theta_{qtx}$, the phase of the mixer is $\beta_{qtx}$;

assuming that the phase delay of the signal after the mixer in the sending direction reaches the mixer in the receiving direction is $\tau$;

Reception direction:

assuming the amplitude of receiving I path mixer is $b_{i\_rx\_mixer}$, the phase of mixer is $\beta_{i\_rx}$;

assuming the amplitude of receiving Q path mixer is $b_{q\_rx\_mixer}$, the phase of mixer is $\beta_{q\_rx}$;

assuming the baseband frequency emitted by the signal generator based on cordic principle is $\omega_0$, the frequency for emitting LO local oscillator is $\omega_{LO}$, the frequency for receiving local oscillator is $\omega_{LO}+\omega_{fixed\_offset}$;

the I path mixing signal is, $TX_i=a_{i\_tx\_bb}*a_{i\_tx\_abb}*\cos(2*pi*\omega_0*t+\theta_{itx})*a_{i\_tx\_mixer}*\cos(2*pi*\omega_{LO}*t+\beta_{itx})$;

the Q path mixing signal is, $TX_q=a_{q\_tx\_bb}*a_{q\_tx\_abb}*\sin(2*pi*\omega_0*t+\theta_{qtx})*a_{q\_tx\_mixer}*\sin(2*pi*\omega_{LO}*t+\beta_{qtx})$.

Then the image signal formula is derived:

combining the mixing signal of the I path and the mixing signal of the Q path, $TX=TX_i+TX_q$;

$$TX_i = a_{i\_tx\_bb}*a_{i\_tx\_abb}*\cos(2*pi*\omega_0*t+\theta_{itx})*a_{i\_tx\_mixer}*\cos(2*pi*\omega_{LO}*t+\beta_{itx}) = 0.5*a_{i\_tx\_bb}*a_{i\_tx\_abb}*a_{i\_tx\_mixer}*\{\cos[2*pi*(\omega_{LO}+\omega_0)*t+(\beta_{itx}+\theta_{itx})]+\cos[2*pi*(\omega_{LO}-\omega_0)*t+(\beta_{itx}-\theta_{itx})]\} \quad \text{(formula 1)}$$

$$TX_q = a_{q\_tx\_bb}*a_{q\_tx\_abb}*\sin(2*pi*\omega_0*t+\theta_{qtx})*a_{q\_tx\_mixer}*\sin(2*pi*\omega_{LO}*t+\beta_{qtx}) = 0.5*a_{q\_tx\_bb}*a_{q\_tx\_abb}*a_{q\_tx\_mixer}*\{-\cos[2*pi*(\omega_{LO}+\omega_0)*t+(\beta_{qtx}+\theta_{qtx})]+\cos[2*pi*(\omega_{LO}-\omega_0)*t+(\beta_{qtx}-\theta_{qtx})]\} \quad \text{(formula 2)}$$

$$TX1 = \{0.5 * a_{i\_tx\_bb} * a_{i\_tx\_abb} * a_{i\_tx\_mixer} * \cos[2*\text{pi}*(\omega_{LO} + \omega_0)*t + (\beta_{itx} + \theta_{itx})] \\
0.5 * a_{q\_tx\_bb} * a_{q\_tx\_abb} * a_{q\_tx\_mixer} * \cos[2*\text{pi}* (\omega_{LO} + \omega_0)*t + (\beta_{qtx} + \theta_{qtx})]\} + \\
\{0.5 * a_{i\_tx\_bb} * a_{i\_tx\_abb} * a_{i\_tx\_mixer} * \cos[2*\text{pi}* (\omega_{LO} - \omega_0)*t + (\beta_{itx} - \theta_{itx})] + \\
0.5 * a_{q\_tx\_bb} * a_{q\_tx\_abb} * a_{q\_tx\_mixer} * \cos[2*\text{pi}* (\omega_{LO} - \omega_0)*t + (\beta_{qtx} - \theta_{qtx})]\}$$ (formula 3)

Thus, the image signal is derived as:

$$\text{Image1} = \{0.5 * a_{i\_tx\_bb} * a_{i\_tx\_abb} * a_{i\_tx\_mixer} * \cos[2*\text{pi}* (\omega_{LO} + \omega_0)*t + (\beta_{itx} + \theta_{itx})] - \\
0.5 * a_{q\_tx\_bb} * a_{q\_tx\_abb} * a_{q\_tx\_mixer} * \cos[2*\text{pi}* (\omega_{LO} + \omega_0)*t + (\beta_{qtx} + \theta_{qtx})]\}$$ (formula 4)

The derived Sig signal is:

$$\text{Sig1} = \{0.5 * a_{i\_tx\_bb} * a_{i\_tx\_abb} * a_{i\_tx\_mixer} * \cos[2*\text{pi}* (\omega_{LO} - \omega_0)*t + (\beta_{itx} - \theta_{itx})] + \\
0.5 * a_{q\_tx\_bb} * a_{q\_tx\_abb} * a_{q\_tx\_mixer} * \cos[2*\text{pi}* (\omega_{LO} - \omega_0)*t + (\beta_{qtx} - \theta_{qtx})]\}$$ (formula 4-1)

If $TX2 = TX_i - TX_q$, the image signal is:

$$\text{Image2} = \{0.5 * a_{i\_tx\_bb} * a_{i\_tx\_abb} * a_{i\_tx\_mixer} * \cos[2*\text{pi}* (\omega_{LO} - \omega_0)*t + (\beta_{itx} - \theta_{itx})] - \\
0.5 * a_{q\_tx\_bb} * a_{q\_tx\_abb} * a_{q\_tx\_mixer} * \cos[2*\text{pi}* (\omega_{LO} - \omega_0)*t + (\beta_{qtx} - \theta_{qtx})]\}$$ (formula 5)

$$\text{Sig2} = \{0.5 * a_{i\_tx\_bb} * a_{i\_tx\_abb} * a_{i\_tx\_mixer} * \cos[2*\text{pi}*(\omega_{LO} + \omega_0)*t + (\beta_{itx} + \theta_{itx})] + \\
0.5 * a_{q\_tx\_bb} * a_{q\_tx\_abb} * a_{q\_tx\_mixer} * \cos[2*\text{pi}* (\omega_{LO} + \omega_0)*t + (\beta_{qtx} + \theta_{qtx})]\}$$

Derivation of the formula for receiving mixer signal:
The ideal case for I path receiving mixer is:

$$(\omega_{LO} + \omega_{fixed\_offset})*t + \beta_{i\_rx})$$ (formula 6)

In the actual process, the I path receiving mixer may generate its own image signal;

$$\text{mixer}_{irx\_image} = b_{i\_rx\_mixer} * \cos[2*\text{pi}*(\omega_{LO} - \omega_{fixed\_offset})*t + \beta_{i\_rx})$$ (formula 7)

The ideal case for Q path receiving mixer is:

$$\text{mixer}_{qrx} = b_{q\_rx\_mixer} * \sin[2*\text{pi}*(\omega_{LO} + \omega_{fixed\_offset})*t + \beta_{q\_rx})$$ (formula 8)

In the actual process, the Q path receiving mixer may generate its own image signal;

$$\text{mixer}_{qrx} = b_{q\_rx\_mixer} * \cos[2*\text{pi}*(\omega_{LO} - \omega_{fixed\_offset})*t + \beta_{q\_rx})$$ (formula 9)

Remark: $\text{mixer}_{irx}$ and $\text{mixer}_{qrx}$ can be written as follows, and their derivation are similar:

$$\text{mixer}_{irx} = b_{i\_rx\_mixer} * \cos[2*\text{pi}*(\omega_{LO} - \omega_{fixed\_offset})*t + \beta_{i\_rx})$$

$$\text{mixer}_{qrx} = b_{q\_rx\_mixer} * \sin[2*\text{pi}*(\omega_{LO} - \omega_{fixed\_offset})*t + \beta_{q\_rx}).$$

In this way, the transmission and reception of the entire system have four combinations (A, B, C, D):

A: $TX1 = TX_i + TX_q$;

RX's LO Freqency = $\omega_{LO} + \omega_{fixed\_offset}$

B: $TX1 = TX_i + TX_q$

RX's LO Freqency = $\omega_{LO} - \omega_{fixed\_offset}$

C: $TX2 = TX_i - TX_q$

RX's LO Freqency = $\omega_{LO} + \omega_{fixed\_offset}$

D: $TX2 = TX_i - TX_q$

RX's LO Freqency = $\omega_{LO} - \omega_{fixed\_offset}$

These four kinds of image analysis are similar. Instead of enumerating them one by one, only combination A is analyzed:

Under Rx mixer, the $RX1_i$ signal generated by the mixing $\text{mixer}_{irx}$ and image1 is:

$$RX1_i = \text{image1} * \text{mixer}_{irx} = \{0.5 * a_{i\_tx\_bb} * a_{i\_tx\_abb} * \\
a_{i\_tx\_mixer} * \cos[2*\text{pi}*(\omega_{LO} + \omega_0)*t + (\beta_{itx} + \theta_{itx})] - \\
0.5 * a_{q\_tx\_bb} * a_{q\_tx\_abb} * a_{q\_tx\_mixer} * \cos[2*\text{pi}* (\omega_{LO} + \omega_0)*t + (\beta_{qtx} + \theta_{qtx})]\} * b_{i\_rx\_mixer} * \cos[2*\text{pi}* (\omega_{LO} - \omega_{fixed\_offset})*t + \beta_{irx})$$

After low-pass filtering, the I path signal received at the baseband is:

$$RX1_i = 0.25 * a_{i\_tx\_bb} * a_{i\_tx\_abb} * a_{i\_tx\_mixer} * b_{i\_rx\_mixer} * \cos \\
(2*\text{pi}*(\omega_{fixed\_offset} - \omega_0)*t + \beta_{irx} - (\beta_{itx} + \theta_{itx})) - \\
0.25 * a_{q\_tx\_bb} * a_{q\_tx\_abb} * a_{q\_tx\_mixer} * b_{i\_rx\_mixer} * \cos \\
(2*\text{pi}*(\omega_{fixed\_offset} - \omega_0)*t + \beta_{irx} - (\beta_{qtx} + \theta_{qtx}))$$

(The changes of the signal including the amplitude and phase by the baseband reception is simplified, it is assumed that there is no change, the formulas are similar) (formula 10)

Under Rx mixer, the $RX2_i$ signal of the mixing $\text{mixer}_{irx\_image}$ and image1 is:

$$RX2_i = \text{image1} * \text{mixer}_{irx\_image} = \{0.5 * a_{i\_tx\_bb} * a_{i\_tx\_abb} * \\
a_{i\_tx\_mixer} * \cos[2*\text{pi}*(\omega_{LO} + \omega_0)*t + (\beta_{itx} + \theta_{itx})] - \\
0.5 * a_{q\_tx\_bb} * a_{q\_tx\_abb} * a_{q\_tx\_mixer} * \cos[2*\text{pi}* (\omega_{LO} + \omega_0)*t + (\beta_{qtx} + \theta_{qtx})]\} * b_{i\_rx\_mixer} * \cos[2*\text{pi}* (\omega_{LO} - \omega_{fixed\_offset})*t + \beta_{irx})$$

After low-pass filtering, the I path signal received at the baseband is:

$$RX2_i = 0.25 * a_{i\_tx\_bb} * a_{i\_tx\_abb} * a_{i\_tx\_mixer} * b_{i\_rx\_mixer} * \cos \\
(2*\text{pi}*(-\omega_{fixed\_offset} - \omega_0)*t + \beta_{irx} - (\beta_{itx} + \theta_{itx})) - \\
0.25 * a_{q\_tx\_bb} * a_{q\_tx\_abb} * a_{q\_tx\_mixer} * b_{i\_rx\_mixer} * \cos \\
(2*\text{pi}*(-\omega_{fixed\_offset} - \omega_0)*t + \beta_{irx} - (\beta_{qtx} + \theta_{qtx}))$$ formula(11)

Under Rx mixer, the $RX3_i$ signal generated by mixing the sig1 and $\text{mixer}_{irx}$ is:

$$RX3_i = \text{sig1} * \text{mixer}_{irx} = \{0.5 * a_{i\_tx\_bb} * a_{i\_tx\_abb} * a_{i\_tx\_mixer} * \cos \\
[(\omega_{LO} - \omega_0)*t + (\beta_{itx} - \theta_{itx})] + \\
0.5 * a_{q\_tx\_bb} * a_{q\_tx\_abb} * a_{q\_tx\_mixer} * \cos[2*\text{pi}* (\omega_{LO} - \omega_0)*t + (\beta_{qtx} - \theta_{qtx})]\} * b_{i\_rx\_mixer} * \cos[2*\text{pi}* (\omega_{LO} + \omega_{fixed\_offset})*t + \beta_{irx})$$

After low-pass filtering, the I path signal received at the baseband is:

$$RX3_i = 0.25 * a_{i\_tx\_bb} * a_{i\_tx\_abb} * a_{i\_tx\_mixer} * b_{i\_rx\_mixer} * \cos \\
(2*\text{pi}*(\omega_{fixed\_offset} + \omega_0)*t + \beta_{irx} - (\beta_{itx} - \theta_{itx})) + \\
0.25 * a_{q\_tx\_bb} * a_{q\_tx\_abb} * a_{q\_tx\_mixer} * b_{i\_rx\_mixer} * \cos \\
(2*\text{pi}*(\omega_{fixed\_offset} + \omega_0)*t + \beta_{irx} - (\beta_{qtx} - \theta_{qtx}))$$ formula(12)

Under Rx mixer, the $RX4_i$ signal generated by mixing the sig1 and $\text{mixer}_{irx\_image}$ is:

$$RX4_i = \text{sig1} * \text{mixer}_{irx} = 0.5 * a_{i\_tx\_bb} * a_{i\_tx\_abb} * a_{i\_tx\_mixer} * \cos \\
[(\omega_{LO} - \omega_0)*t + (\beta_{itx} - \theta_{itx})] + \\
0.5 * a_{q\_tx\_bb} * a_{q\_tx\_abb} * a_{q\_tx\_mixer} * \cos[2*\text{pi}* (\omega_{LO} - \omega_0)*t + (\beta_{qtx} - \theta_{qtx})]\} * b_{i\_rx\_mixer} * \cos[2*\text{pi}* (\omega_{LO} - \omega_{fixed\_offset})*t + \beta_{irx})$$

After low-pass filtering, the I path signal received at the baseband is:

$$RX4_i = 0.25 * a_{i\_tx\_bb} * a_{i\_tx\_abb} * a_{i\_tx\_mixer} * b_{i\_rx\_mixer} * \cos \\
(2*\text{pi}*(-\omega_{fixed\_offset} + \omega_0)*t + \beta_{irx} - (\beta_{itx} - \theta_{itx})) + \\
0.25 * a_{q\_tx\_bb} * a_{q\_tx\_abb} * a_{q\_tx\_mixer} * b_{i\_rx\_mixer} * \cos \\
(2*\text{pi}*(-\omega_{fixed\_offset} + \omega_0)*t + \beta_{irx} - (\beta_{qtx} - \theta_{qtx}))$$ formula(13)

Under Rx mixer, the $RX1_q$ signal generated by mixing the image1 and $\text{mixer}_{irx}$ is:

$$RX1_q = \text{image1} * \text{mixer}_{qrx} = \{0.5 * a_{i\_tx\_bb} * a_{i\_tx\_abb} * \\
a_{i\_tx\_mixer} * \cos[2*\text{pi}*(\omega_{LO} + \omega_0)*t + (\beta_{itx} + \theta_{itx})] - \\
0.5 * a_{q\_tx\_bb} * a_{q\_tx\_abb} * a_{q\_tx\_mixer} * \cos[2*\text{pi}* (\omega_{LO} + \omega_0)*t + (\beta_{qtx} + \theta_{qtx})]\} * b_{q\_rx\_mixer} * \sin[(\omega_{LO} + \omega_{fixed\_offset})*t + \beta_{qrx})$$

After low-pass filtering, the I path signal received at the baseband is:

$$RX1_q = 0.25 * a_{i\_tx\_bb} * a_{i\_tx\_abb} * a_{i\_tx\_mixer} * b_{q\_rx\_mixer} * \sin(2*pi*(\omega_{fixed\_offset} - \omega_0)*t + \beta_{qrx} - (\beta_{itx} + \theta_{itx})) - 0.25 * a_{q\_tx\_bb} * a_{q\_tx\_abb} * a_{q\_tx\_mixer} * b_{q\_rx\_mixer} * \sin(2*pi*(\omega_{fixed\_offset} - \omega_0)*t + \beta_{qrx} - (\beta_{qtx} + \theta_{qtx}))$$

(The changes of the signal including the amplitude and phase by the baseband reception is simplified, it is assumed that there is no change, the formulas are similar) (formula 14)

Under Rx mixer, the $RX2_q$ signal generated by mixing the image1 and $mixer_{irx\_image}$ is:

$$RX2_q = image1 * mixer_{irx\_image} = \{0.5 * a_{i\_tx\_bb} * a_{i\_tx\_abb} * a_{i\_tx\_mixer} * \cos[2*pi*(\omega_{LO} + \omega_0)*t + (\beta_{itx} + \theta_{itx})] - 0.5 * a_{q\_tx\_bb} * a_{q\_tx\_abb} * a_{q\_tx\_mixer} * \cos[2*pi*(\omega_{LO} + \omega_0)*t + (\beta_{qtx} + \theta_{qtx})]\} * b_{q\_rx\_mixer} * \sin[(\omega_{LO} - \omega_{fixed\_offset})*t + \beta_{qrx}]$$

After low-pass filtering, the I path signal received at the baseband is:

$$RX2_q = 0.25 * a_{i\_tx\_bb} * a_{i\_tx\_abb} * a_{i\_tx\_mixer} * b_{q\_rx\_mixer} * \sin(2*pi*(-\omega_{fixed\_offset} - \omega_0)*t + \beta_{qrx} - (\beta_{itx} + \theta_{itx})) - 0.25 * a_{q\_tx\_bb} * a_{q\_tx\_abb} a_{q\_tx\_mixer} * b_{i\_rx\_mixer} * \sin(2*pi*(-\omega_{fixed\_offset} - \omega_0)*t + \beta_{qrx} - (\beta_{qtx} + \theta_{qtx})) \quad \text{formula(15)}$$

Under Rx mixer, the $RX3_q$ signal generated by mixing the sig1 and $mixer_{irx}$ is:

$$RX3_q = sig1 * mixer_{qrx} = \{0.5 * a_{i\_tx\_bb} * a_{i\_tx\_abb} * a_{i\_tx\_mixer} * \cos[(\omega_{LO} - \omega_0)*t + (\beta_{itx} - \theta_{itx})] + 0.5 * a_{q\_tx\_bb} * a_{q\_tx\_abb} * a_{q\_tx\_mixer} * \cos[2*pi*(\omega_{LO} - \omega_0)*t + (\beta_{qtx} - \theta_{qtx})]\} * b_{q\_rx\_mixer} * \sin[(\omega_{LO} + \omega_{fixed\_offset})*t + \beta_{qrx}]$$

After low-pass filtering, the I path signal received at the baseband is:

$$RX3_i = 0.25 * a_{i\_tx\_bb} * a_{i\_tx\_abb} * a_{i\_tx\_mixer} * b_{q\_rx\_mixer} * \sin(2*pi*(\omega_{fixed\_offset} + \omega_0)*t + \beta_{qrx} - (\beta_{itx} - \theta_{itx})) + 0.25 * a_{q\_tx\_bb} * a_{q\_tx\_abb} * a_{q\_tx\_mixer} * b_{q\_rx\_mixer} * \sin(2*pi*(\omega_{fixed\_offset} + \omega_0)*t + \beta_{qrx} - (\beta_{qtx} - \theta_{qtx})) \quad \text{Formula(16)}$$

Under Rx mixer, the $RX4_q$ signal generated by mixing the sig1 and $mixer_{irx-image}$ is:

$$RX4_q = sig1 * mixer_{irx} = 0.5 * a_{i\_tx\_bb} * a_{i\_tx\_abb} * a_{i\_tx\_mixer} * \cos[(\omega_{LO} - \omega_0)*t + (\beta_{itx} - \theta_{itx})] + 0.5 * a_{q\_tx\_bb} * a_{q\_tx\_abb} * a_{q\_tx\_mixer} * \cos[2*pi*(\omega_{LO} - \omega_0)*t + (\beta_{qtx} - \theta_{qtx})]\} * b_{q\_rx\_mixer} * \sin[(\omega_{LO} - \omega_{fixed\_offset})*t + \beta_{qrx}]$$

After low-pass filtering, the I path signal received at the baseband is:

$$RX4_q = 0.25 * a_{i\_tx\_bb} * a_{i\_tx\_abb} * a_{i\_tx\_mixer} * b_{q\_rx\_mixer} * \sin(2*pi*) - \omega_{fixed\_offset} + \omega_0)*t + \beta_{qrx} - (\beta_{itx} - \theta_{itx})) + 0.25 ** a_{q\_tx\_bb} * a_{q\_tx\_abb} * a_{q\_tx\_mixer} * b_{q\_rx\_mixer} * \sin(2*pi*(-\omega_{fixed\_offset} + \omega_0)*t + \beta_{qrx} - (\beta_{qtx} - \theta_{qtx})) \quad \text{Formula(17)}$$

According to the above formulas, it is determined the formula of the image signal to be monitored:

$$RX1_i = 0.25 * a_{i\_tx\_bb} * a_{i\_tx\_abb} * a_{i\_tx\_mixer} * b_{i\_rx\_mixer} * \cos(2*pi*(\omega_{fixed\_offset} - \omega_0)*t + \beta_{irx} - (\beta_{itx} + \theta_{itx})) - 0.25 * a_{q\_tx\_bb} * a_{q\_tx\_abb} * a_{q\_tx\_mixer} * b_{i\_rx\_mixer} * \cos(2*pi*(\omega_{fixed\_offset} - \omega_0)*t + \beta_{irx} - (\beta_{qtx} + \theta_{qtx})) \quad \text{Formula (10)}$$

$$RX4_i = 0.25 * a_{i\_tx\_bb} * a_{i\_tx\_abb} * a_{i\_tx\_mixer} * b_{i\_rx\_mixer} * \cos(2*pi*(-\omega_{fixed\_offset} + \omega_0)*t + \beta_{irx} - (\beta_{itx} - \theta_{itx})) + 0.25 * a_{q\_tx\_bb} * a_{q\_tx\_abb} * a_{q\_tx\_mixer} * b_{i\_rx\_mixer} * \cos(2*pi*) - \omega_{fixed\_offset} + \omega_0)*t + \beta_{irx} - (\beta_{qtx} - \theta_{qtx})) \quad \text{Formula (13)}$$

$$RX1_q = 0.25 * a_{i\_tx\_bb} * a_{i\_tx\_abb} * a_{i\_tx\_mixer} * b_{q\_rx\_mixer} * \sin(2*pi*(\omega_{fixed\_offset} - \omega_0)*t + \beta_{qrx} - (\beta_{itx} - \theta_{itx})) - 0.25 * a_{q\_tx\_bb} * a_{q\_tx\_abb} * a_{q\_tx\_mixer} * b_{q\_rx\_mixer} * \sin(2*pi*(\omega_{fixed\_offset} - \omega_0)*t + \beta_{qrx} - (\beta_{qtx} + \theta_{qtx})) \quad \text{Formula (14)}$$

$$RX4_q = 0.25 * a_{i\_tx\_bb} * a_{i\_tx\_abb} * a_{i\_tx\_mixer} * b_{q\_rx\_mixer} * \sin(2*pi*(-\omega_{fixed\_offset} + \omega_0)*t + \beta_{qrx} - (\beta_{itx} - \theta_{itx})) + 0.25 ** a_{q\_tx\_bb} * a_{q\_tx\_abb} * a_{q\_tx\_mixer} * b_{q\_rx\_mixer} * \sin(2*pi*(-\omega_{fixed\_offset} + \omega_0)*t + \beta_{qrx} - (\beta_{qtx} - \theta_{qtx})) \quad \text{Formula (17)}$$

The signal frequency of TX1 image1 is $\omega_{LO} + \omega_0$, the signal frequency of sig1 $\omega_{LO} - \omega_{fixed\_offset}$, the frequency for receiving LO is $\omega_{LO} + \omega_{fixed\_offset}$, the mirror frequency for receiving LO is $\omega_{LO} - \omega_{fixed\_offset}$.

The frequency of image1 signal is $\omega_{LO} + \omega_0$ and $\omega_{LO} + \omega_{fixed\_offset}$, the receiving image frequency to be observed $|\omega_{fixed\_offset} - \omega_0|$ is generated, the signal frequency sig1 is $\omega_{LO} - \omega_{fixed\_offset}$, the mirror frequency of LO is $\omega_{LO} - \omega_{fixed\_offset}$, the receiving image frequency to be observed $|\omega_{fixed\_offset} - \omega_0|$ is generated, and the two signals are combined together.

RX_i=RX1_i+RX4_i, which is the image signal representation quantity received from the I path that needs to be monitored in practice.

RX_q=RX1_q+RX4_q, which is the image signal representation quantity received from the Q path that needs to be monitored in practice.

Here, RX_i and RX_q need to be monitored to evaluate the smallest image signal, further to get the amplitude and phase to be canceled. When the image signal is small enough, the image signal calibration can be performed by accurately calculating the phase and amplitude cancellation values according to the method shown in FIG. 1.

Figure 2:
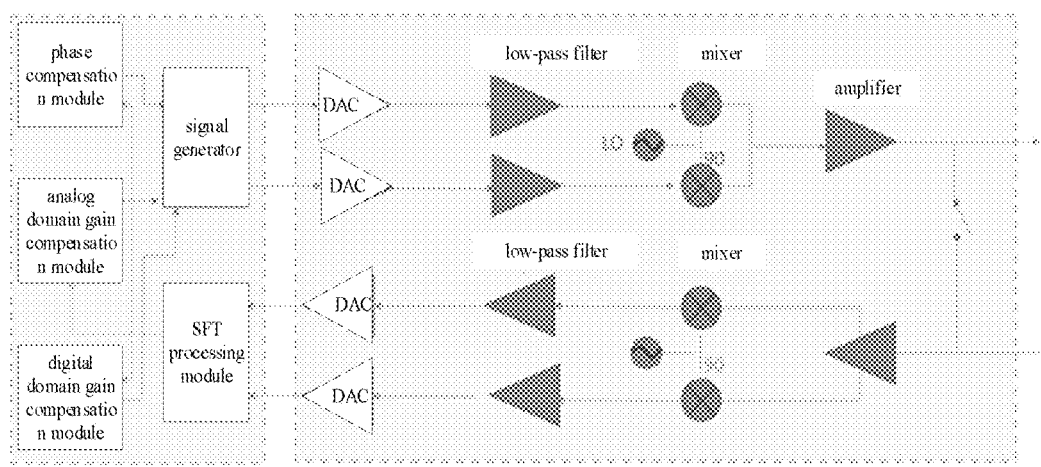
FIG. 2 shows a schematic structural diagram of a signal calibration system generated based on an imbalance of an I path and a Q path provided by an embodiment of the present disclosure.

In order to better understand the implementation process of this embodiment, as shown in FIG. 2, the present disclosure provides a corresponding signal calibration system architecture based on imbalance of I path and Q path, which is divided into left and right parts. The left part includes a signal generator based on a cordic Principle, a SFT processing module, an analog domain gain compensation module (Analog Gain), a digital domain gain compensation module (Digital Gain), a phase compensation module (PHASE) and other main modules. The right part is a typical RF chain part, it is necessary to loop the transmitted signal back to the signal receiving direction behind the radiation amplifier through the switch, in conjunction with the image signal calibration. The radio frequency chain part includes a digital-to-analog converter (DAC), an analog-to-digital converter (ADC), an amplifier, a low-pass filter (Lowpass), a local oscillator (LO), and a mixer.

Through the coordinated operation between the above-mentioned modules, in the case of imbalance of the I path and the Q path, high-precision image signal correction and cancellation can be achieved.

It should be noted that each of the above formulas is not the only formula for implementing the present application, but is only used as an implementation manner of the embodiments. Technicians can make appropriate modifications to the formula according to business needs, and still fall within the scope of this application, such as adding parameters or multiple values.

Figure 3:
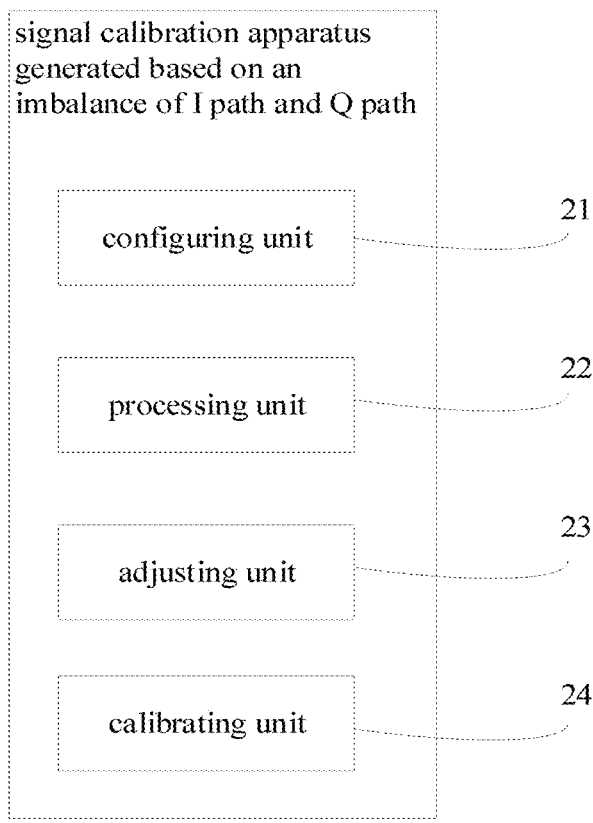
FIG. 3 shows a schematic structural diagram of a signal calibration device generated based on an imbalance of an I path and a Q path provided by an embodiment of the present disclosure.

Further, as a specific implementation of the method of FIG. 1, an embodiment of the present application provides a signal calibration device generated based on an imbalance of an I path and a Q path, as shown in FIG. 3, the device includes a configuring unit 21, a processing unit 22, an adjusting unit 23, and a calibrating unit 24.

The configuring unit 21 is configured for sending a cosine signal and a sine signal through a signal generator with configurable signal amplitude and phase when receiving a signal to be calibrated, and transmitting the cosine signal and the sine signal in the I path and the Q path respectively, wherein each path is configured to correspond to a signal, the cosine signal and the sine signal are configured to loop back to a signal receiving direction after passing through a transmitting amplifier.

The processing unit 22 is configured for processing a signal obtained by a down converter in the signal receiving direction according to a preset Fourier transformation rule.

The adjusting unit 23 is configured for performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal; and The calibrating unit 24 is configured for calibrating the image signal corresponding to the signal to be calibrated according to the phase cancellation value and the amplitude cancellation value.

In a specific application scenario, the amplitude cancellation value may include the gain value of the gain amplifier of the analog domain and the corresponding gain value of the digital domain.

Correspondingly, the adjusting unit 23 may be specifically configured for performing the phase adjustment by adjusting the signal generator according to the processing result, and monitoring a minimum value corresponding to the image signal or a maximum value corresponding to a sig signal by performing a phase local traversal or a phase global traversal, so as to record a best phase value of the corresponding image signal that needs to be compensated at this time, as the phase cancellation value of the image signal; the adjusting unit 23 may be configured for performing the amplitude adjustment by adjusting the gain amplifier of the I path or Q path analog domain according to the processing result, and monitoring the minimum value corresponding to the image signal or the maximum value corresponding to the sig signal based on the adjustment of the gain amplifier, so as to record the gain value of the gain amplifier of the corresponding analog domain at this time; and the adjusting unit 23 may be configured for monitoring a global minimum value corresponding to the image signal or a global maximum value corresponding to the sig signal to record the corresponding gain value of the digital domain at this time, by performing an amplitude local traversal or an amplitude global traversal in the digital domain.

In a specific application scenario, the calibrating unit 24 may be specifically configured to calibrate the phase of the image signal corresponding to the signal to be calibrated by referring to the best phase value, and to calibrate the amplitude of the image signal corresponding to the signal to be calibrated by referring to the gain value of analog domain gain amplifier and digital domain gain value.

In a specific application scenario, the gain value of the analog domain gain amplifier includes the gain value of the analog domain gain amplifier corresponding to I path and the gain value of the analog domain gain amplifier corresponding to Q path. Correspondingly, the calibrating module 24 may also be specifically configured for simulating the gain value of the analog domain gain amplifier corresponding to I path to the analogue domain gain amplifier corresponding to I path, and configured for simulating the gain value of the analog domain gain amplifier corresponding to Q path to the analogue domain gain amplifier corresponding to Q path, and configured for performing an amplitude compensation of the digital domain on the image signal corresponding to the signal to be calibrated, by taking the gain value of the digital domain as a parameter and using a preset formula.

In a specific application scenario, if the signal generator sends the cosine signal on the I path and the sine signal on the Q path, the calibrating module 24 may specifically be configured to compensate I path digital domain gain by a formula:

$$I_{calibrated} = gain_{I\text{-}digital\text{-}offset} * I_{tx} * \cos(phase_{offset}) + gain_{I\text{-}digital\text{-}offset} * Q_{tx} * \sin(phase_{offset})$$

The calibrating module 24 may also be configured to compensate Q path digital domain gain by a formula $Q_{calibrated} = gain_{Q\text{-}digital\text{-}offset} * Q_{tx}$. $I_{tx}$ is the I path data that needs to be sent, $Q_{tx}$ is the Q path data that needs to be sent, $phase_{offset}$ is the best phase value to be compensated, $gain_{I\text{-}digital\text{-}offset}$ is the gain value of I path digital domain, $gain_{Q\text{-}digital\text{-}offset}$ is the gain value of Q path digital domain, $I_{calibrated}$ is the value that needs to be compensated for the gain in the I path digital domain, $Q_{calibrated}$ is the value that needs to be compensated for the gain in the Q path digital domain. These two formulas can be used to precisely compensate the gains in the I path and Q path digital domain.

In a specific application scenario, the signal generator can generate sine and cosine waves based on the cordic principle, or store the data points of the sine and cosine waves to the random access memory (RAM), so as to send out the waveforms of sine and cosine waves from RAM by the waveform generator. The preset Fourier transform rule is a variable-length discrete Fourier transform (SFT) rule.

In a specific application scenario, the adjusting unit may be specifically configured for calculating the minimum value by $I_{sft\_image}^2$ and $Q_{sft\_image}^2$, $\sqrt{I_{sft\_image}^2 + Q_{sft\_image}^2}$, $|I_{sft\_image}|$, or $|Q_{sft\_image}|$, and taking the minimum value as an evaluation criteria of the minimum value corresponding to the image signal, and $I_{sft\_image}$ is a result obtained by processing the image signal in the I path through the SFT rule, $Q_{sft\_image}$ is a result obtained by processing the image signal in the Q path through the SFT rule; calculating the maximum value by $I_{sft\_sig}^2$ and $Q_{sft\_sig}^2$, $\sqrt{I_{sig}^2 + Q_{sft\_sig}^2}$, $|I_{sft\_sig}|$, or $|Q_{sft\_sig}|$, taking the maximum value as an evaluation criteria of the maximum value corresponding to the sig signal, and $I_{sft\_sig}$ is a result obtained by processing the sig signal in the I path through the SFT rule, $Q_{sft\_sig}$ is a result obtained by processing the sig signal in the Q path through the SFT rule.

It should be noted that other corresponding descriptions of each functional unit involved in a signal calibration apparatus based on an imbalance of I path and Q path provided by the embodiments of the present application may refer to the corresponding descriptions in FIG. 1 and will not be repeated here.

Based on the method shown in FIG. 1 above, correspondingly, an embodiment of the present application further provides a storage medium on which a computer program is stored. The program is executed by a processor to implement the above-mentioned signal calibration method generated based on an imbalance of an I path and a Q path as shown in FIG. 1.

Based on the above embodiments as shown in FIGS. 1 to 2, in order to achieve the above purpose, the embodiments of the present application also provide a signal calibration physical device generated based on an imbalance of an I path and a Q path. The physical device includes a storage medium configured to store a computer program and a processor configured to execute a signal calibration method generated based on an imbalance of an I path and a Q path as shown in FIG. 1 to FIG. 2.

By applying the technical solution of the present application, a specific theoretical analysis is performed on the image signal generated after the RF parts are mixed, and combined with a precise amplitude and phase control on the calibration signal by the signal generator based on the cordic principle, the ADC and DAC are set higher clock rates (such as 160M, etc.) to further improve the accuracy of the calibration. At the same time, the image signal calibration is divided into phase calibration and amplitude calibration, and the amplitude calibration is divided into analog calibration and digital calibration. The minimum value of the image signal is obtained by continuously adjusting the amplitude and phase. In image signal estimation, variable length SFT is adopted to improve the accuracy of image signal estimation under different signal-to-noise ratios, and can be used to estimate the received frequency components in a more precise and smaller scale. The embodiments of the present application can realize the accurate estimation of the image signal, can obtain the accurate minimum value of the image signal, can obtain the accurate phase of the image signal, the analog gain compensation value and the digital gain compensation value, thereby achieving high-precision image signal correction and cancellation.

Through the description of the above embodiments, those skilled in the art can clearly understand that the present application can be implemented by hardware, or by software plus a necessary general hardware platform. Based on this understanding, the technical solution of the present application can be embodied in the form of a software product, which can be stored in a non-volatile storage medium (which can be a CD-ROM, U disk, mobile hard disk, etc.), including several instructions used to enable a computer device (which may be a personal computer, a server, or a network device, etc.) to execute the method of each implementation scenario of the present application.

Those skilled in the art may understand that the drawings are only schematic diagrams of a preferred implementation scenario, and the modules or processes in the drawings are not necessarily required to implement the present application.

Those skilled in the art may understand that the modules of the device in the implementation scenario may be distributed in the device in the implementation scenario according to the description of the implementation scenario, or may be changed accordingly in one or more devices different from the implementation scenario. The modules in the above implementation scenarios can be combined into one module, or can be further split into multiple sub-modules.

The above-mentioned serial number of the present application is for description only, and does not represent the pros and cons of the implementation scenario.

The above disclosure is only a few specific implementation scenarios of the present application, however, the present application is not limited thereto, and any change that can be thought of by those skilled in the art should fall within the protection scope of the present application.

We claim:

1. A signal calibration method generated based on an imbalance of an I path and a Q path, comprising:

sending a cosine signal and a sine signal through a signal generator with configurable signal amplitude and phase when receiving a signal to be calibrated, transmitting the cosine signal and the sine signal in the I path and the Q path respectively, each path corresponding to a signal, the cosine signal and the sine signal being configured to loop back to a signal receiving direction after passing through a transmitting amplifier;

processing a signal obtained by a down converter in the signal receiving direction according to a preset Fourier transformation rule;

performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal; and calibrating the image signal corresponding to the signal to be calibrated according to the phase cancellation value and the amplitude cancellation value.

2. The method of claim 1, wherein the amplitude cancellation value comprises a gain value of the gain amplifier of the IQ analog domain, and a corresponding gain value of the digital domain, the operation of "performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal" comprises:

performing the phase adjustment by adjusting the signal generator according to the processing result, and monitoring a minimum value corresponding to the image signal or a maximum value corresponding to a sig signal by performing a phase local traversal or a phase global traversal, so as to record a best phase value of the corresponding image signal that needs to be compensated at this time, as the phase cancellation value of the image signal;

performing the amplitude adjustment by adjusting the gain amplifier of the I path or Q path analog domain according to the processing result, and monitoring the minimum value corresponding to the image signal or the maximum value corresponding to the sig signal based on the adjustment of the gain amplifier, so as to record the gain value of the gain amplifier of the corresponding analog domain at this time; and in the digital domain, by performing an amplitude local traversal or an amplitude global traversal, monitoring a global minimum value corresponding to the image signal or a global maximum value corresponding to the sig signal to record the corresponding gain value of the digital domain at this time.

3. The method of claim 2, wherein the operation of "calibrating the image signal corresponding to the signal to be calibrated according to the phase cancellation value and the amplitude cancellation value" comprises:

calibrating the phase of the image signal corresponding to the signal to be calibrated with reference to the best phase value; and calibrating the amplitude of the image signal corresponding to the signal to be calibrated with reference to the gain value of the gain amplifier of the analog domain and the gain value of the digital domain.

4. The method of claim 3, wherein the gain value of the gain amplifier of the analog domain comprises a gain value of the gain amplifier of the analog domain corresponding to the I path, and a gain value of the gain amplifier of the analog domain corresponding to the Q path, the operation of "calibrating the amplitude of the image signal corresponding to the signal to be calibrated with reference to the gain value of the gain amplifier of the analog domain and the gain value of the digital domain" comprises:

configuring the gain value of the gain amplifier of the analog domain corresponding to the I path to the gain amplifier of the I path analog domain;

configuring the gain value of the gain amplifier of the analog domain corresponding to the Q path to the gain amplifier of the Q path analog domain;

taking the gain value of the digital domain as a parameter, and using a preset formula, performing an amplitude compensation of the digital domain on the image signal corresponding to the signal to be calibrated.

5. The method of claim 4, wherein upon the signal generator generating the cosine signal on the I path and the sine signal on the Q path, the operation of "taking the gain value of the digital domain as a parameter, and using a preset formula, performing an amplitude compensation of the digital domain on the image signal corresponding to the signal to be calibrated" comprises:

compensating of the gain value of the I path digital domain by a formula, $I_{calibrated} = gain_{I\text{-}digital\text{-}offset}*I_{tx}*\cos(phase_{offset}) + gain_{I\text{-}digital\text{-}offset}*Q_{tx}*\sin(phase_{offset})$, and compensating of the gain value of the Q path digital domain by a formula, $Q_{calibrated} = gain_{Q\text{-}digital\text{-}offset}*Q_{tx}$ wherein, $I_{tx}$ is I path data that needs to be sent, $Q_{tx}$ is Q path data that needs to be sent, $phase_{offset}$ is the best phase value that needs to be compensated, $gain_{I\text{-}digital\text{-}offset}$ is the gain value of the I path digital domain, $gain_{Q\text{-}digital\text{-}offset}$ is the gain value of the Q path digital domain, $I_{calibrated}$ is a value that needs to be compensated for the gain value of the I path digital domain, $Q_{calibrated}$ is a value that needs to be compensated for the gain value of the Q path digital domain.

6. The method of claim 4, wherein signal generator generates a sine wave and a cosine wave based on a cordic principle, or stores data points of the sine and cosine waves to a random access memory (RAM), so as to send waveforms of the sine and cosine waves from the RAM by a waveform generator; the preset Fourier transformation rule is a variable length sparse Fourier transformation (SFT) rule.

7. The method of claim 6, wherein the minimum value corresponding to the image signal includes:

calculating the minimum value by $I_{sft\_image}^2$ and $Q_{sft\_image}^2$, or $\sqrt{I_{sft\_image}^2 + Q_{sft\_image}^2}$, or $|I_{sft\_image}|$, or $|Q_{sft\_image}|$, and taking the minimum value as an evaluation criteria of the minimum value corresponding to the image signal, wherein, $I_{sft\_image}$ is a result obtained by processing the image signal in the I path through the SFT rule, $Q_{sft\_image}$ is a result obtained by processing the image signal in the Q path through the SFT rule; and the maximum value corresponding to the sig signal comprises:

calculating the maximum value by $I_{sft\_sig}^2$ and $Q_{sft\_sig}^2$, or $\sqrt{I_{sft\_sig}^2 + Q_{sft\_sig}^2}$, or $|I_{sft\_sig}|$, or $|Q_{sft\_sig}|$, taking the maximum value as an evaluation criteria of the maximum value corresponding to the sig signal, wherein, $I_{sft\_sig}$ is a result obtained by processing the sig signal in the I path through the SFT rule, $Q_{sft\_sig}$ is a result obtained by processing the sig signal in the Q path through the SFT rule.

8. A non-transitory storage medium, storing a computer program, wherein, the program when executed by a processor performs a signal calibration method generated based on an imbalance of an I path and a Q path, the signal calibration method generated based on the imbalance of the I path and the Q path comprises:

sending a cosine signal and a sine signal through a signal generator with configurable signal amplitude and phase when receiving a signal to be calibrated, transmitting the cosine signal and the sine signal in the I path and the Q path respectively, each path corresponding to a signal, the cosine signal and the sine signal being configured to loop back to a signal receiving direction after passing through a transmitting amplifier;

processing a signal obtained by a down converter in the signal receiving direction according to a preset Fourier transformation rule;

performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal; and calibrating the image signal corresponding to the signal to be calibrated according to the phase cancellation value and the amplitude cancellation value.

9. The non-transitory storage medium of claim 8, wherein the amplitude cancellation value comprises a gain value of the gain amplifier of the IQ analog domain, and a corresponding gain value of the digital domain, the operation of "performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal" comprises:

performing the phase adjustment by adjusting the signal generator according to the processing result, and monitoring a minimum value corresponding to the image signal or a maximum value corresponding to a sig signal by performing a phase local traversal or a phase global traversal, so as to record a best phase value of the corresponding image signal that needs to be compensated at this time, as the phase cancellation value of the image signal;

performing the amplitude adjustment by adjusting the gain amplifier of the I path or Q path analog domain according to the processing result, and monitoring the minimum value corresponding to the image signal or the maximum value corresponding to the sig signal based on the adjustment of the gain amplifier, so as to record the gain value of the gain amplifier of the corresponding analog domain at this time; and in the digital domain, by performing an amplitude local traversal or an amplitude global traversal, monitoring a global minimum value corresponding to the image signal or a global maximum value corresponding to the sig signal to record the corresponding gain value of the digital domain at this time.

10. The non-transitory storage medium of claim 9, wherein the operation of "calibrating the image signal corresponding to the signal to be calibrated according to the phase cancellation value and the amplitude cancellation value" comprises:

calibrating the phase of the image signal corresponding to the signal to be calibrated with reference to the best phase value; and calibrating the amplitude of the image signal corresponding to the signal to be calibrated with reference to the gain value of the gain amplifier of the analog domain and the gain value of the digital domain.

11. The non-transitory storage medium of claim 10, wherein the gain value of the gain amplifier of the analog domain comprises a gain value of the gain amplifier of the analog domain corresponding to the I path, and a gain value of the gain amplifier of the analog domain corresponding to the Q path, the operation of "calibrating the amplitude of the image signal corresponding to the signal to be calibrated with reference to the gain value of the gain amplifier of the analog domain and the gain value of the digital domain" comprises:
configuring the gain value of the gain amplifier of the analog domain corresponding to the I path to the gain amplifier of the I path analog domain;
configuring the gain value of the gain amplifier of the analog domain corresponding to the Q path to the gain amplifier of the Q path analog domain;
taking the gain value of the digital domain as a parameter, and using a preset formula, performing an amplitude compensation of the digital domain on the image signal corresponding to the signal to be calibrated.

12. The non-transitory storage medium of claim 11, wherein upon the signal generator generating the cosine signal on the I path and the sine signal on the Q path, the operation of "taking the gain value of the digital domain as a parameter, and using a preset formula, performing an amplitude compensation of the digital domain on the image signal corresponding to the signal to be calibrated" comprises:
compensating of the gain value of the I path digital domain by a formula, $I_{calibrated} = gain_{I\text{-}digital\text{-}offset} * I_{tx} * \cos(phase_{offset}) + gain_{I\text{-}digital\text{-}offset} * Q_{tx} * \sin(phase_{offset})$, and compensating of the gain value of the Q path digital domain by a formula, $Q_{calibrated} = gain_{Q\text{-}digital\text{-}offset} * Q_{tx}$, wherein,
$I_{tx}$ is I path data that needs to be sent, $Q_{tx}$ is Q path data that needs to be sent,
$phase_{offset}$ is the best phase value that needs to be compensated, $gain_{I\text{-}digital\text{-}offset}$ is the gain value of the I path digital domain, $gain_{Q\text{-}digital\text{-}offset}$ is the gain value of the Q path digital domain, $I_{calibrated}$ is a value that needs to be compensated for the gain value of the I path digital domain, $Q_{calibrated}$ is a value that needs to be compensated for the gain value of the Q path digital domain.

13. The non-transitory storage medium of claim 11, wherein signal generator generates a sine wave and a cosine wave based on a cordic principle, or stores data points of the sine and cosine waves to a random access memory (RAM), so as to send waveforms of the sine and cosine waves from the RAM by a waveform generator; the preset Fourier transformation rule is a variable length sparse Fourier transformation (SFT) rule.

14. The non-transitory storage medium of claim 13, wherein the minimum value corresponding to the image signal includes:
calculating the minimum value by $I_{sft\_image}^2$ and $Q_{sft\_image}^2$, or $\sqrt{I_{sft\_image}^2 + Q_{sft\_image}^2}$, or $|I_{sft\_image}|$, or $|Q_{sft\_image}|$, and taking the minimum value as an evaluation criteria of the minimum value corresponding to the image signal, wherein,
$I_{sft\_image}$ is a result obtained by processing the image signal in the I path through the SFT rule, $Q_{sft\_image}$ is a result obtained by processing the image signal in the Q path through the SFT rule; and
the maximum value corresponding to the sig signal comprises:
calculating the maximum value by $I_{sft\_sig}^2$ and $Q_{sft\_sig}^2$, or $\sqrt{I_{sig}^2 + Q_{sft\_sig}^2}$, or
$|I_{sft\_sig}|$, or $|Q_{sft\_sig}|$, taking the maximum value as an evaluation criteria of the maximum value corresponding to the sig signal, wherein, $I_{sft\_sig}$ is a result obtained by processing the sig signal in the I path through the SFT rule, $Q_{sft\_sig}$ is a result obtained by processing the sig signal in the Q path through the SFT rule.

15. A signal calibration device generated based on an imbalance of an I path and a Q path, comprising a storage medium, a processor, and a computer program stored on the storage medium and executable on the processor, the processor when executing the program performs a signal calibration method generated based on the imbalance of the I path and the Q path, the signal calibration method generated based on the imbalance of the I path and the Q path comprises:
sending a cosine signal and a sine signal through a signal generator with configurable signal amplitude and phase when receiving a signal to be calibrated, transmitting the cosine signal and the sine signal in the I path and the Q path respectively, each path corresponding to a signal, the cosine signal and the sine signal being configured to loop back to a signal receiving direction after passing through a transmitting amplifier;
processing a signal obtained by a down converter in the signal receiving direction according to a preset Fourier transformation rule;
performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal; and
calibrating the image signal corresponding to the signal to be calibrated according to the phase cancellation value and the amplitude cancellation value.

16. The signal calibration device generated based on an imbalance of an I path and a Q path of claim 15, wherein the amplitude cancellation value comprises a gain value of the gain amplifier of the IQ analog domain, and a corresponding gain value of the digital domain, the operation of "performing a phase adjustment and an amplitude adjustment by adjusting the signal generator, gain amplifiers of I path and Q path analog domains, and a corresponding digital domain according to the processing result, respectively, so as to determine an appropriate phase cancellation value and an appropriate amplitude cancellation value for an image signal" comprises:
performing the phase adjustment by adjusting the signal generator according to the processing result, and monitoring a minimum value corresponding to the image signal or a maximum value corresponding to a sig signal by performing a phase local traversal or a phase global traversal, so as to record a best phase value of the corresponding image signal that needs to be compensated at this time, as the phase cancellation value of the image signal;
performing the amplitude adjustment by adjusting the gain amplifier of the I path or Q path analog domain according to the processing result, and monitoring the minimum value corresponding to the image signal or the maximum value corresponding to the sig signal based on the adjustment of the gain amplifier, so as to record the gain value of the gain amplifier of the corresponding analog domain at this time; and in the digital domain, by performing an amplitude local traversal or an amplitude global traversal, monitoring a global minimum value corresponding to the image signal or a global maximum value corresponding to the sig signal to record the corresponding gain value of the digital domain at this time.

17. The signal calibration device generated based on an imbalance of an I path and a Q path of claim 16, wherein the operation of "calibrating the image signal corresponding to the signal to be calibrated according to the phase cancellation value and the amplitude cancellation value" comprises:

calibrating the phase of the image signal corresponding to the signal to be calibrated with reference to the best phase value; and calibrating the amplitude of the image signal corresponding to the signal to be calibrated with reference to the gain value of the gain amplifier of the analog domain and the gain value of the digital domain.

18. The signal calibration device generated based on an imbalance of an I path and a Q path of claim 17, wherein the gain value of the gain amplifier of the analog domain comprises a gain value of the gain amplifier of the analog domain corresponding to the I path, and a gain value of the gain amplifier of the analog domain corresponding to the Q path, the operation of "calibrating the amplitude of the image signal corresponding to the signal to be calibrated with reference to the gain value of the gain amplifier of the analog domain and the gain value of the digital domain" comprises:

configuring the gain value of the gain amplifier of the analog domain corresponding to the I path to the gain amplifier of the I path analog domain;

configuring the gain value of the gain amplifier of the analog domain corresponding to the Q path to the gain amplifier of the Q path analog domain;

taking the gain value of the digital domain as a parameter, and using a preset formula, performing an amplitude compensation of the digital domain on the image signal corresponding to the signal to be calibrated.

19. The signal calibration device generated based on an imbalance of an I path and a Q path of claim 18, wherein upon the signal generator generating the cosine signal on the I path and the sine signal on the Q path, the operation of "taking the gain value of the digital domain as a parameter, and using a preset formula, performing an amplitude compensation of the digital domain on the image signal corresponding to the signal to be calibrated" comprises:

compensating of the gain value of the I path digital domain by a formula, $I_{calibrated} = gain_{I\text{-}digital\text{-}offset} * I_{tx} * \cos(phase_{offset}) + gain_{I\text{-}digital\text{-}offset} * Q_{tx} * \sin(phase_{offset})$, and compensating of the gain value of the Q path digital domain by a formula, $Q_{calibrated} = gain_{Q\text{-}digital\text{-}offset} * Q_{tx}$, wherein, $I_{tx}$ is I path data that needs to be sent, $Q_{tx}$ is Q path data that needs to be sent, $phase_{offset}$ is the best phase value that needs to be compensated, $gain_{I\text{-}digital\text{-}offset}$ is the gain value of the I path digital domain, $gain_{Q\text{-}digital\text{-}offset}$ is the gain value of the Q path digital domain, $I_{calibrated}$ is a value that needs to be compensated for the gain value of the I path digital domain, $Q_{calibrated}$ is a value that needs to be compensated for the gain value of the Q path digital domain; and/or signal generator generates a sine wave and a cosine wave based on a cordic principle, or stores data points of the sine and cosine waves to a random access memory (RAM), so as to send waveforms of the sine and cosine waves from the RAM by a waveform generator; the preset Fourier transformation rule is a variable length sparse Fourier transformation (SFT) rule.

* * * * *